United States Patent Office 3,364,943
Patented Jan. 23, 1968

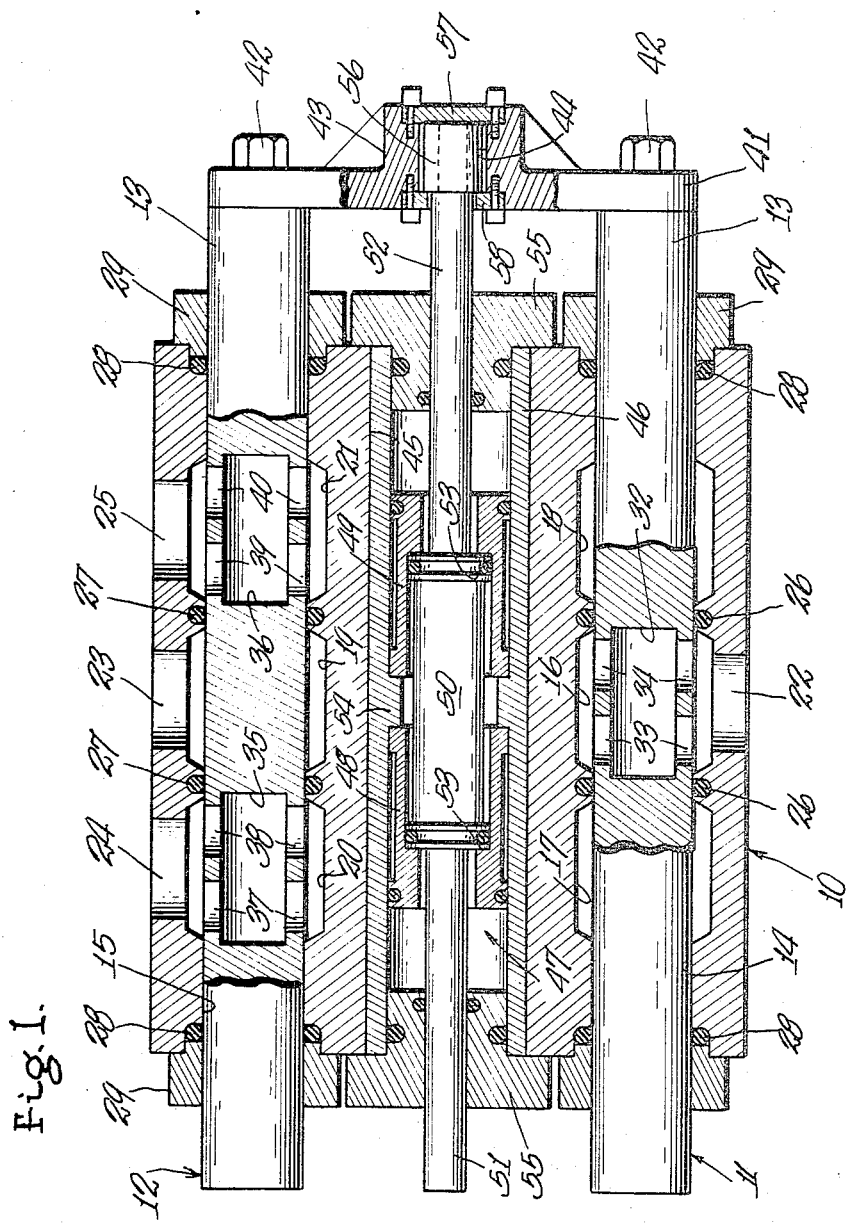

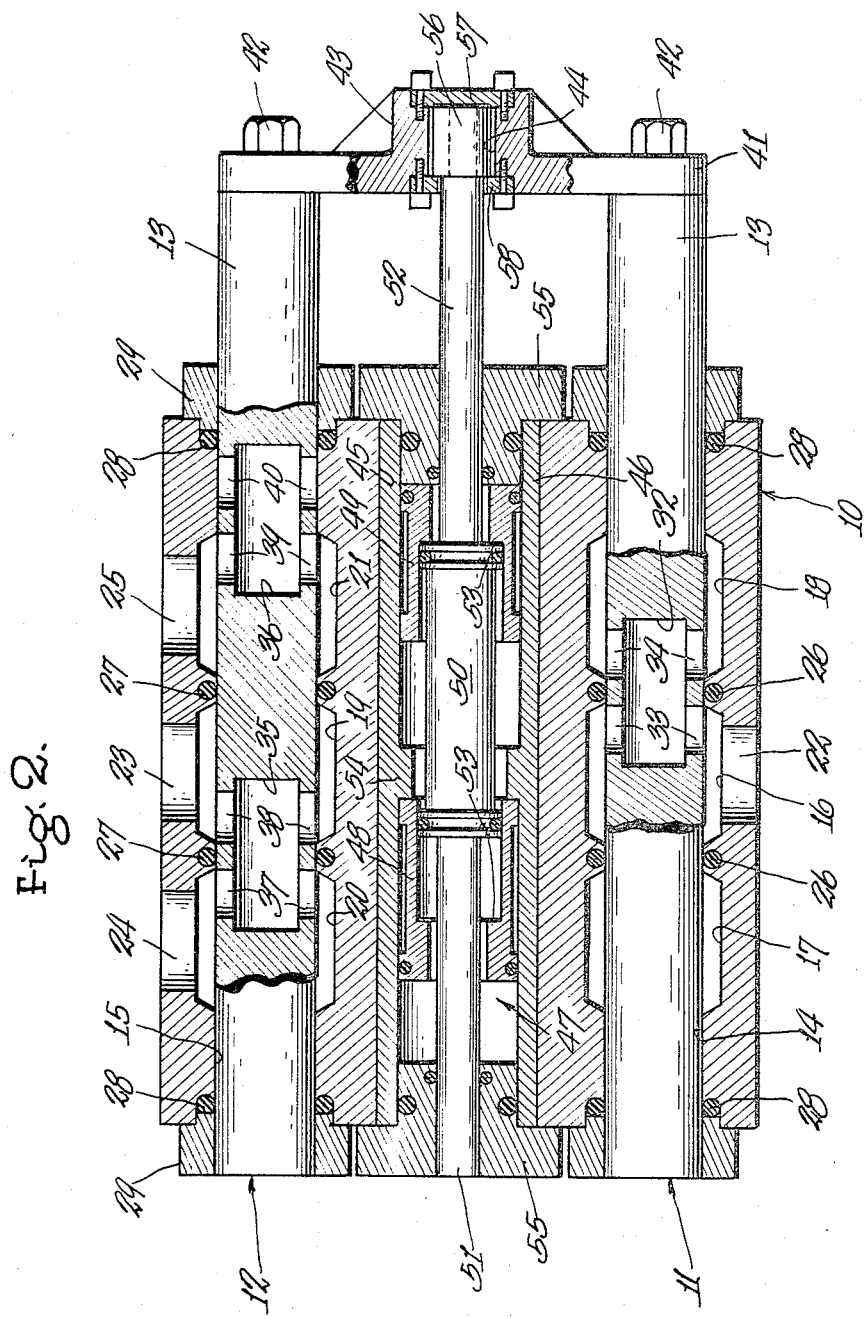

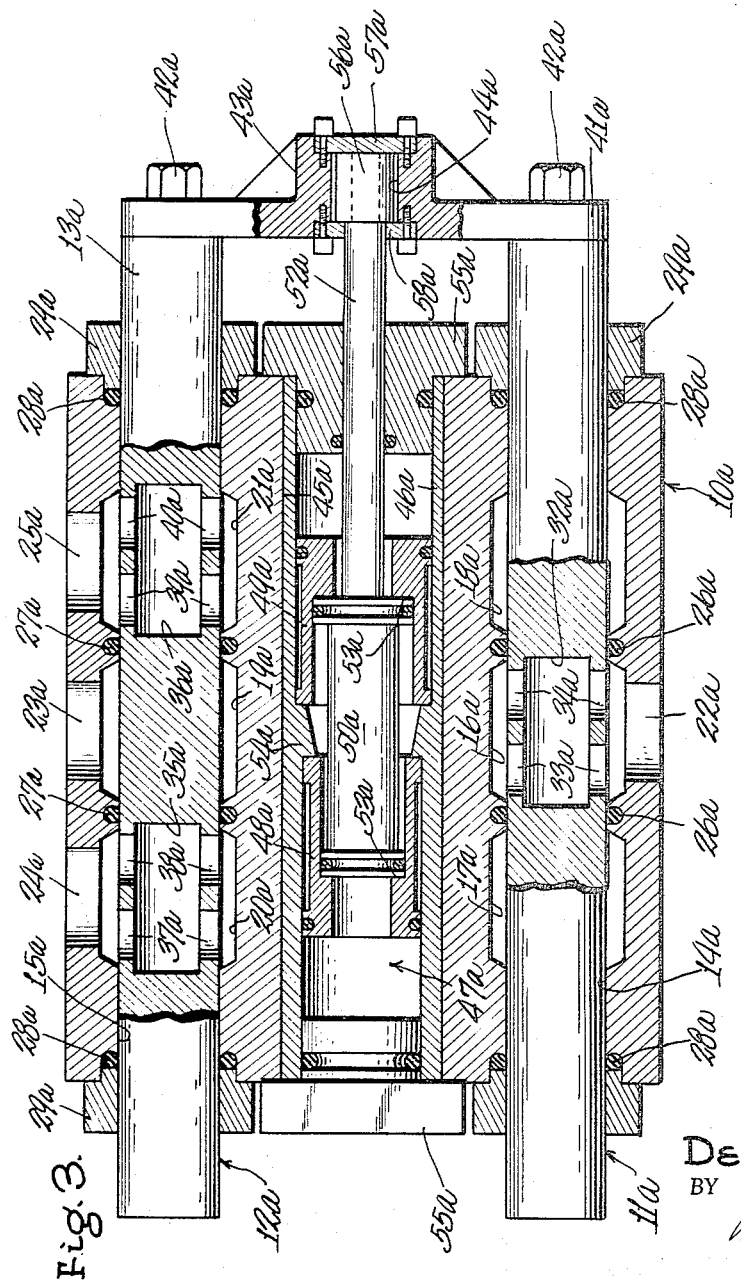
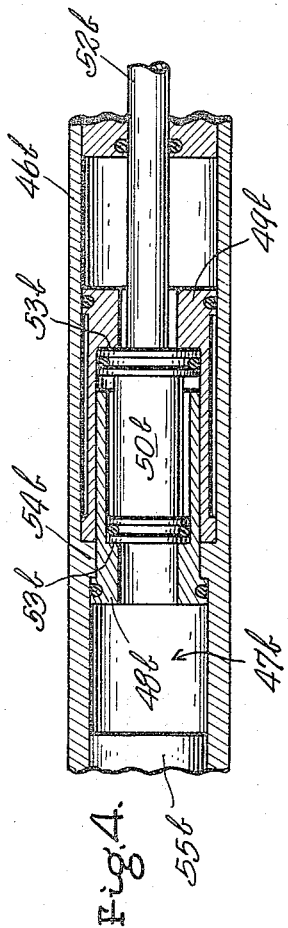

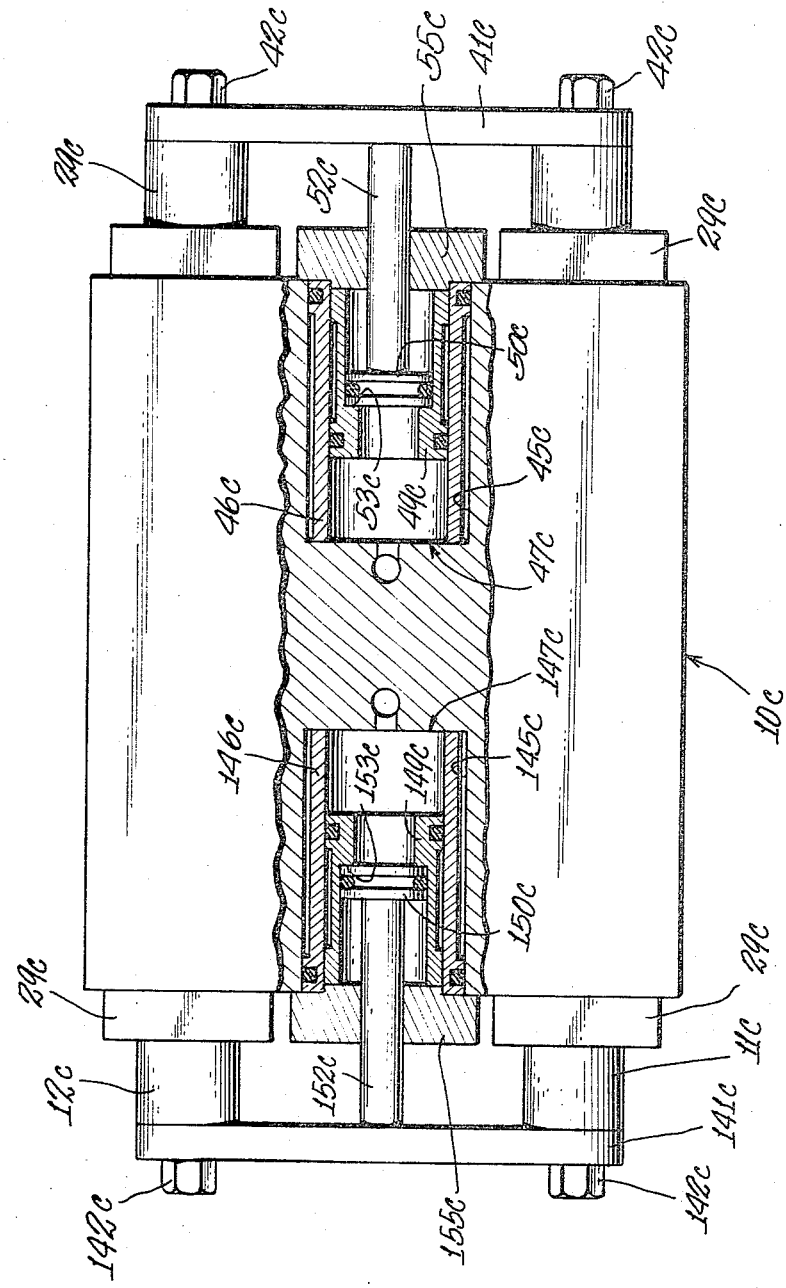

3,364,943
THREE-POSITION FLUID ACTUATORS FOR VALVES AND THE LIKE
Dennis B. Keller, Salem, Ohio, assignor to Salem Valve Company, Salem, Ohio
Filed Mar. 1, 1966, Ser. No. 530,894
12 Claims. (Cl. 137—596.18)

ABSTRACT OF THE DISCLOSURE

For use with fluid control valves and the like, the present invention provides a three-position fluid actuator formed of a plurality of pistons adapted to be shifted by fluid pressure. The pistons are so related to each other that regardless of the direction in which they are shifted, the same effective working area is presented to the fluid pressure. The invention also provides a valve having a pair of valve members in spaced, side-by-side relation with a pair of fluid cylinders disposed therebetween in back-to-back relation which effect valve member movement.

---

The present invention relates to fluid actuators, more particularly to three-position fluid actuators especially adapted to operate a fluid control valve, and the principal object of the invention is to provide new and improved actuators and valve-actuator assemblies of the character described.

Heretofore, fluid control valves have been operated by three-position fluid actuators and in prior-art, valve-actuator assemblies, the actuator has been disposed in end-to-end relation with the valve and operated by air pressure. In an attempt to provide a more compact and more easily serviced assembly, it has been proposed to dispose the actuator in side-by-side relation with the valve working parts and more specifically, within the valve housing. In order to minimize transverse size of the actuator, it is desirable to operate the latter by liquid under high pressure rather than by air under a much lower pressure.

With prior-art, three-position fluid actuators, it has been recognized that with a constant pressure operating fluid, a greater force is exerted by the actuator in one direction of operation than in the other. Along with the exertion of a greater force in one direction of operation, such prior-art actuators also consume a greater volume of fluid in one direction of operation than in the other and also tend to operate at different speeds in different directions of operation. So long as the actuator is operated by air pressure, the differential force exerted by the actuator and the differential consumption of fluid pressure is ordinarily of little consequence. When, however, the actuator is operated by a source of high pressure liquid, the differential fluid consumption presents the following problem:

In order to insure adequate force application of the actuator in the direction in which it exerts the least force, it is necessary to provide a source of pressure greater than that required when the actuator operates in the opposite direction. Similarly, in order to insure adequate speed of operation of the actuator in the direction in which it consumes the largest volume of liquid, it is necessary to provide a greater volume of liquid flow from the pressure source than that required when the actuator operates in the opposite direction.

From the foregoing, it will be apparent that when prior-art, three-position actuators are operated from a source of high-pressure liquid, such source must be oversize in both pressure and volume delivery in order to accommodate the differential characteristics aforesaid of the actuator. Such an oversize source, of course, is more expensive than is a smaller source. Even so, speed of response of the actuator will differ in different directions of operation thereof unless additional mechanisms, such as speed control valves, are employed.

In contrast, the present invention provides a three-position actuator which will exert the same force in either direction of operation and which consumes the same volume of fluid in each operational direction and thus has the same speed of operation in each direction. These and other advantages will readily become apparent from a study of the following description and from the appended drawings.

In the drawings accompanying this specification and forming a part of this application, there is disclosed, for purpose of illustration, embodiments which the invention may assume, and in these drawings:

FIGURE 1 is a horizontal sectional view through a preferred embodiment of the invention, FIGURE 2 is a view similar to FIGURE 1 but with certain parts shown in another position, FIGURE 3 is a view like FIGURE 1 but of another embodiment of the invention, FIGURE 4 is a fragmentary view similar to FIGURES 1 and 3 but of still another embodiment, and FIGURE 5 is a plan view, partially in section, of a further embodiment.

Referring to FIGURE 1, the valve therein shown comprises a valve housing 10 in which are disposed a pair of axially shiftable, elongated valve members 11 and 12 in spaced, side-by-side, parallel relation. For a purpose to appear, valve members 11 and 12 project beyond the housing at 13. Each valve member is slidably received within respective bores 14, 15 in the housing, the bore 14 having a central, radial enlargement 16 flanked by radial enlargements 17 and 18, and the bore 15 having a central, radial enlargement 19 flanked by radial enlargements 20, 21.

Formed in the housing 10 is an inlet port 22 communicating with the bore enlargement 16, an exhaust port 23 communicating with the bore enlargement 19, and outlet ports 24, 25 respectively communicating with bore enlargements 20, 21. Flanking the bore enlargement 16 and sealably engaging the valve member 11 are suitable annular sealing members 26 which prevent communication between the bore enlargement 16 and bore enlargements 17 and 18. Similarly, suitable sealing annular sealing members 27 flank the bore enlargement 19 and sealably engage the valve member 12 to prevent communication between the bore enlargement 19 and the bore enlargements 20 and 21.

To prevent fluid leakage about valve members 11, 12 through the ends of their respective bores, suitable annular sealing members 28 engage respective valve members and are maintained in position by suitable apertured caps 29 which may be removably secured to the valve housing 10 in any convenient manner. Although not shown, communication between bore enlargements 17 and 20 and between bore enlargements 18 and 21 may be provided in any suitable manner; such as, for example, by passages formed in the valve housing or by suitable, external conduits.

Valve member 11 has an internal cavity 32 intersected by a series of apertures 33, 34 formed in the valve member. Similarly, the valve member 12 has a pair of axially spaced, internal cavities 35, 36, respectively intersected by a series of apertures 37, 38 and 39, 40. In the position of parts shown, the apertures 33, 34 of valve member 11 are wholly within the bore enlargement 16 while the apertures 37, 38 and 39, 40 of valve member 12 are wholly within respective bore enlargements 20, 21. Thus, it will be seen that in the position of parts seen in FIGURE 1, there will be no communication between bore enlargement 16 (which communicates with inlet port 22) and bore enlargements 17 and 18. Similarly, there will be no communication between bore enlargement 19 (which communicates with exhaust port 23) and bore enlargements 20, 21 (which respectively communicate with outlet ports 24, 25).

If the valve members 11, 12 are simultaneously shifted from the positions seen in FIGURE 1, to the positions seen in FIGURE 2, it will be noted that communication will be established between the bore enlargements 16, 18 via the valve member cavity 32 and its apertures 33, 34. Thus, inlet fluid may flow from the inlet port 22 through the outlet port 25 via the bore enlargement 18 and the bore enlargement 21 previously mentioned as being in communication with the bore enlargement 18. At the same time, communication will be established between the bore enlargements 19, 20 via the valve member cavity 35 and its apertures 37, 38. Thus, fluid may flow in the outlet port 24 and out of the exhaust port 23 via the bore enlargement 20 and the bore enlargement 19.

In the event the valve members are shifted to the left from the position seen in FIGURE 1 rather than to the right as seen in FIGURE 2, communication will be established between the bore enlargements 16, 17 and between the bore enlargements 19, 21 to thus allow inlet fluid to flow out the outlet port 24 and to allow fluid to flow in the outlet port 25 and out the exhaust port 23.

To provide for the aforesaid unitary movement of the valve members 11, 12, a rigid bar 41 extends between the member ends 13 and is removably secured thereto as by means of capscrews 42. For a purpose to appear, the intermediate portion of bar 41 is enlarged at 43 to provide an internal pocket 44.

Still referring to FIGURE 1, it will be seen that the valve members 11, 12 are spaced apart far enough to provide a bore 45 for closely but removably receiving a sleeve 46 which constitutes a cylinder barrel for a three-position fluid actuator 47 as will next be described, it being noted that by positioning the actuator 47 intermediate the spaced-apart value members 11, 12, a very compact assembly is provided.

Slidable in respective ends of barrel 46 are outer pistons 48, 49 in which is slidable an inner poston 50 having aligned, oppositely extending piston rods 51, 52 which project beyond respective cylinder barrel ends as shown. The ends of pistons 48, 49 are reduced in size to provide shoulders 53 for abutment with respective ends of the inner piston 50 and the barrel 46 is provided with a reduced size intermediate portion 54 providing shoulders for abutment with respective outer pistons 48, 49. The relative size of the outer and inner pistons is such that the effective area of each outer piston is twice that of the inner piston for a purpose to appear.

Closing respective ends of cylinder barrel 46 are caps 55 secured in position by any suitable means, such caps, of course, being apertured to slidably pass respective piston rods 51, 52. For sealing against loss of fluid pressure, suitable seals, such as the illustrated O rings, are carried by the pistons and the cylinder barrel caps aforesaid.

Piston rod 52 has a radially enlarged head 56 received in the previously described pocket 44. For assembly reasons, head 56 may be threaded on a reduced diameter portion of piston rod 52 so that it may be removed when necessary. The pocket 44 is preferably somewhat greater in transverse size than the rod head 56 to provide a radial clearance therebetween to accommodate slight machining irregularities. The head 56 is maintained in the pocket 44 by any suitable means; for example, a cap 57 may be affixed to the bar enlargement 43 for bearing against the outer side of the head 56 while an apertured cap 58 may be affixed to the bar 41 for bearing against the underside of the head 56.

In operation, when fluid pressure is admitted to both ends of the cylinder barrel 46 through suitable ports not herein shown but disposed to provide for fluid flow into and out of the cylinder barrel to the left of outer piston 48 and to the right of outer piston 49 respectively, the outer pistons 48, 49 will be forced toward each other and, because of engagement against the shoulder portion 54 and, because of engagement of inner piston 50 with the outer piston shoulders 53, the inner piston will be held in the centralized position seen in FIGURE 1. This, of course, will position the valve members 11, 12 in their centralized positions shown.

If fluid pressure is now exhausted from the right-hand end of the cylinder barrel 46, fluid pressure in the left-hand end thereof, acting on the inner piston 50 will move the latter and valve members 11, 12 to the right to the position seen in FIGURE 2 wherein outer piston 49 abuts its end cap 55. Note that in moving to the right, the inner piston will carry with it the outer piston 49.

When the valve is to be returned to the position seen in FIGURE 1, fluid pressure will again be re-admitted to the right-hand end of the cylinder barrel 46. Such fluid pressure, acting against the area of the outer piston 49 and being opposed by the fluid pressure at the left-hand end of the cylinder barrel which, however, acts against the much smaller area of the inner piston, will return the parts to the position seen in FIGURE 1.

In the event the valve is to be shifted in the opposite direction; i.e., to the left from the piston seen in FIGURE 1 rather than to the right as seen in FIGURE 2, fluid pressure at the left end of the cylinder barrel 46 will be exhausted and the inner piston will move to the left, shifting the valve members 11, 12 therewith, until the outer piston 48 abuts its cap 55. To return the parts to the position of FIGURE 1, it is only necessary to re-admit fluid pressure to the left-hand end of the cylinder barrel 46 wherein such pressure, exerted against the outer piston 48 and opposed by the pressure acting against the much smaller area of the inner piston 50, will shift the parts once again to the position seen in FIGURE 1.

It is an important feature of the embodiment thus far described that since the outer pistons 48, 49 have the same transverse size, since opposite ends of the inner piston 50 have the same transverse size, and since piston rods 51, 52 have the same transverse size, the effective areas of respective outer pistons 48, 49 will be the same as will be the effective areas of respective ends of the inner piston 50.

Accordingly, the same force will be exerted by the actuator assembly 47 and the same volume of fluid will be consumed thereby whether the actuator is shifted to the right or to the left from the intermediate position seen in FIGURE 1. Similarly, the same force will be exerted and the same volume of fluid will be consumed by the actuator 47 whether it is shifted from the right or from the left to its intermediate position. Moreover, since the force exerted by an outer piston is always opposed by a counter-force exerted by the inner piston, and since the effective area of each outer piston is double that of the inner piston, the actuator will exert the same force whether it shifts away from or toward its intermediate position.

By present definition, the volume of fluid consumed by the actuator is to be considered the volume of fluid that must be forced into the actuator to cause movement thereof.

The embodiment of the invention seen in FIGURE 3 is similar to that hereinbefore disclosed; accordingly, corresponding parts are identified by the same reference characters as before but with the suffix *a* added. The structure of FIGURE 3 differs from that previously disclosed in that the piston rod extending from the left of the inner piston 50a has been omitted thus eliminating a source of wear and potential leakage. The cap 55a at the left-hand end of the cylinder barrel, of course, need no longer be apertured with the omission of this piston rod.

Upon elimination of the piston rod aforesaid, however, the cross-sectional area previously occupied by the now omitted piston rod is added to the effective area of both the outer piston 48a and the left end of inner piston 50a. Therefore, to restore the balance previously existing between the outer pistons and the balance between respective ends of the inner piston, both the outer piston 49a and the right end of the inner piston 50a have been increased in diameter an amount proportionate to the cross-sectional area of the piston rod 52a. Thus, notwithstanding the fact that the piston rod 52a reduces the effective areas of the piston 49a and the right-hand end of piston 50a, the increase in diameter of both of these pistons restores their effective areas to precisely that of their counterparts at the left-hand end of he cylinder barrel 46a.

From the foregoing, it will be evident that the outer pistons 48a, 49a have the same effective area and that respective ends of the inner piston 50a also have the same effective area. Accordingly, the balance of force and volume of fluid consumption in opposite directions of operation of the actuator 47a is present in the same manner as previously disclosed with respect to the embodiment of FIGURES 1 and 2.

While the area balance aforesaid upon elimination of one of the piston rods has been described as being effectuated by increasing the diameters of both the outer piston 49a and the right end of the inner piston 50a, the same result could be attained by a proportionate decrease in diameter of both the outer piston 48a and the left end of the inner piston 50a.

The embodiment of FIGURE 4 is similar to FIGURE 3 and thus corresponding parts are identified with the same reference characters as before but with the suffix b added. In this embodiment, the outer piston 49b and the right-hand end of the inner piston 50b are enlarged similar to pistons 49a and 50a of FIGURE 3 and for similar reasons.

The principal distinction in structure between FIGURES 3 and 4 is that in the latter, inner piston 50b is axially shortened and the outer piston 48b has telescopic engagement with the outer piston 49b. Thus, a shorter length assembly with the same stroke, or a greater stroke assembly with the same length, is provided with no loss in length of the outer pistons and thus no loss in stability thereof. As illustrated in FIGURE 4, outer pistons 48b, 49b, are actually longer than before for greater stability while at the same time a greater stroke is provided.

While the three-position actuators thus far disclosed are shown operating a fluid valve, it will readily be apparent that they are not limited to such use but may be used to operate other suitable devices which require three-position disposition.

In the embodiment of the invention seen in FIGURE 5, corresponding parts are identified by the same reference characters as before but with the suffix c added; however, where certain parts are duplicated as will hereinafter appear, reference characters of one of the parts so duplicated will further carry the prefix 1.

The embodiment of FIGURE 5 differs from those previously disclosed in that two separate fluid actuators 47c, 147c are employed to shift the valve members rather than a single, but double-ended actuator. Thus, the housing 10c is formed with longitudinally aligned but axially spaced bores 45c, 145c entering from respective housing ends and each respectively contains a removable sleeve 46c, 146c.

Slidable in the sleeve 46c is the hollow piston 49c and slidable in the latter is the piston 50c. The piston rod 52c extends from the piston 50c and abuts the bar 41c. For reasons to appear, the piston rod need not be secured to the bar but may merely abut the latter. Piston 49c provides an abutment 53c which is engageable with the piston 50c for the same reasons as in the previously disclosed embodiments. Closing the right end of bore 45c is an apertured cover 55c which slidably passes the piston rod 52c.

Since the actuator 147c is preferably a mirror image of actuator 47c, it is believed that a specific description of its various parts would be superfluous; however, it is to be noted that a bar 141c, identical to bar 41c, connects the left ends of the valve members 11c, 12c and that the piston rod 152c abuts such bar 141c.

Assuming that adjoining end of the fluid actuator cylinders 47c, 147c are charged with the same fluid pressure, the parts will be positioned as shown with the outer pistons 49c, 149c adjacent the respective caps 55c, 155c to thus center the valve members 11c, 12c.

If, for example, fluid pressure in cylinder 147c is now exhausted, the fluid pressure in cylinder 47c, acting against the piston 50c, will urge the latter to the right. Such movement of piston 50c will, through the piston rod 52c and the bar 41c, move the valve members to the right. Such movement to the right of the valve members will, through the bar 141c and the piston rod 152c move piston 150c to the right and, because of engagement of this piston with the piston abutment 153c, movement of piston 150c to the right will carry with it the piston 149c.

When it is desired to return the parts to the intermediate position shown, it is only necessary to re-admit fluid pressure to the inner end of cylinder 147c. Such fluid pressure, acting against the area of the piston 149c, will shift the latter to the left to the position shown and, because of interengagement between pistons 149c, 150c, the latter will be carried along with the former. This movement of piston 150c, acting through the piston rod 152c, and the bar 141c, will re-center the valve members. Movement of piston 149c to the left as above-described will be opposed by the pressure in cylinder 47c; however, since such pressure is acting at this time only against the area of the smaller piston 50c, the latter cannot resist the larger force exerted by the piston 149c.

Similarly, in the event the valve members 11c, 12c are to be shifted to the left from the centered position shown, it is only necessary to exhaust the fluid pressure at the inner end of cylinder 47c. Re-admission of such fluid pressure into such cylinder will return the parts to their illustrated positions.

In order to obtain the balance of forces previously described, the effective area of piston 49c will preferably be double that of piston 50c. Moreover, the effective areas of pistons 49c, 149c will be the same as will be those of the pistons 50c, 150c.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A three position fluid actuator comprising a housing providing bore means, a first pair of pistons within said housing and axially slidable independently of each other within said bore means, second piston means within said housing and slidably supported by the pistons of said first piston pair for axial movement independently thereof, abutment means in part provided by said second piston means and respective pistons of said piston pair and interengageable to provide for unitary movement of said second piston means and one of said first pistons during second piston means movement in one direction and interengageable to provide for unitary movement of said second piston means and the other of said first pistons during second piston means movement in the opposite direction, and piston rod means extending axially of said second piston means to the exterior of said housing and movable with such second piston means, said second piston means having the same effective area at each end exposed to fluid pressure to equalize the force exerted thereby in either direction of movement thereof and the pistons of said first piston pair having the same effective area exposed to fluid pressure to equalize the force exerted by either piston of such first piston pair.

2. The construction of claim 1 wherein the effective working area of each piston of said first pair of pistons is double the effective working area of said second piston means to equalize the force exerted by said actuator during operation thereof in either direction.

3. The construction of claim 1 wherein said piston rod means comprises a pair of piston rods of the same transverse size extending axially of but from opposite ends of said second piston means.

4. The construction of claim 1 wherein said piston rod means comprises a single piston rod extending from but one end of said second piston means.

5. The construction of claim 4 wherein the diameter of said second piston means at its rod end is greater than that of its opposite end by an amount proportionate to the area of said piston rod for the purpose aforesaid, and wherein the diameter of that piston of said piston pair which is adjacent said piston rod is greater than that of the other piston of such pair by an amount proportionate to the area of said piston rod for the purpose aforesaid.

6. The construction of claim 4 wherein the diameter of said second piston means at its rod end is greater than that of its opposite end by an amount proportionate to the area of said piston rod for the purpose aforesaid, wherein the diameter of that piston of said piston pair which is adjacent said piston rod is greater than that of the other piston of such pair by an amount proportionate to the area of said piston rod for the purpose aforesaid, and wherein the effective working area of each piston of said first pair of pistons is double the effective working area of said second piston means to equalize the force exerted by said actuator during operation thereof in either direction.

7. The construction of claim 5 wherein that piston of said piston pair which is adjacent said piston rod slidably receives the other piston of such piston pair in telescoping relation.

8. The construction of claim 7 wherein said other piston of said piston pair is slidable within said first-mentioned piston of such pair along the same surface as the piston rod end of said second piston means.

9. A fluid control valve comprising a housing, a pair of elongated valve members in spaced, side-by-side relation within said housing and axially shiftable to control fluid flow therethrough, bridging members spaced axially of and extending between and connecting said valve members for unitary movement, and a pair of fluid cylinders within said housing between said valve members for effecting valve member movement aforesaid, each cylinder having a piston rod projecting therefrom and such piston rods extending in opposite directions for engagement with respective bridging members.

10. The construction of claim 9 wherein said piston rods extend in a direction away from each other for engagement with respective bridging members and wherein fluid pressure is admitted and released from those cylinder ends remote from their piston rods to effect piston rod movement and consequent valve member movement.

11. The construction of claim 10 wherein said fluid cylinders cooperate to provide three position actuating means for said valve members, wherein each fluid cylinder comprises an axially shiftable first piston, axially shiftable second pistons within respective first pistons and mounting respective piston rods, and abutment means in part provided by each first piston and in part provided by each second piston and interengaging to provide for unitary movement of said pistons in one direction of movement.

12. The construction of claim 11 wherein each valve member projects beyond opposite ends of said housing, wherein said bridging members connect adjoining projecting portions of said valve members, wherein said cylinders are in end-to-end relation adjacent respective housing ends, wherein the cylinder ends opposite those from which respective piston rods project are disposed in spaced relation, and wherein the only interconnection between the pistons of one cylinder and those of the other cylinder includes said valve members.

References Cited

UNITED STATES PATENTS

| | | | |
|---|---|---|---|
| 1,435,921 | 11/1922 | Grossenbacher | 137—595 |
| 1,465,742 | 8/1923 | Shipley et al. | 137—596.18 X |
| 1,954,379 | 4/1934 | Eller | 92—53 X |
| 2,699,757 | 1/1955 | Tornkvist et al. | 92—13 X |
| 2,806,449 | 9/1957 | Simmon | 91—169 X |
| 3,031,853 | 5/1962 | Olson | 92—13 X |
| 3,097,572 | 7/1963 | Macy | 92—13 |

FOREIGN PATENTS

| | | |
|---|---|---|
| 975,107 | 10/1950 | France. |
| 1,235,484 | 5/1960 | France. |

HENRY T. KLINKSIEK, *Primary Examiner.*